US012672038B2

(12) United States Patent
Lu et al.

(10) Patent No.: US 12,672,038 B2
(45) Date of Patent: Jun. 30, 2026

(54) MULTILINK DEVICE FOR SWITCHING OPERATION

(71) Applicant: MediaTek Singapore Pte. Ltd., Singapore (SG)

(72) Inventors: Kai Ying Lu, San Jose, CA (US); Yongho Seok, San Jose, CA (US); James Chih-Shi Yee, San Jose, CA (US); Yonggang Fang, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 442 days.

(21) Appl. No.: 18/110,156

(22) Filed: Feb. 15, 2023

(65) Prior Publication Data

US 2023/0262553 A1 Aug. 17, 2023

Related U.S. Application Data

(63) Continuation-in-part of application No. 18/103,999, filed on Jan. 31, 2023.

(Continued)

(51) Int. Cl.
*H04W 36/06* (2009.01)
*H04W 36/00* (2009.01)

(52) U.S. Cl.
CPC ........ *H04W 36/06* (2013.01); *H04W 36/0069* (2018.08)

(58) Field of Classification Search
CPC . H04W 36/06; H04W 36/0069; H04W 36/20; H04W 76/15; H04W 84/12
See application file for complete search history.

(56) References Cited

U.S. PATENT DOCUMENTS

2021/0212118 A1    7/2021   Lu et al.
2021/0250848 A1    8/2021   Seok et al.
2021/0274500 A1    9/2021   Cariou et al.

FOREIGN PATENT DOCUMENTS

CN          113543243 A      10/2021
WO      WO 2022/272003 A1    12/2022
WO      WO-2022260486 A1 *   12/2022   ............ H04W 76/15

OTHER PUBLICATIONS

Wilus: "LB266 CR for nonprimary link channel switch", IEEE Draft ; II-22-1767-00-00BE-LB266-CR-FOR-NONPRIMARY-LINK-CHANNEL-SWITCH, IEEE-SA Mentor, Piscataway, NJ USA, vol. 802.11 EHT; 802.11be Oct. 13, 2022 (Oct. 13, 2022), pp. 1-5, XP068194690, Retrieved from the Internet: URL:https://mentor. ieee.org/802.11/dcn/22/11-22-1767-00-00be-lb266-cr-for-nonprimary-link-channel-switch.docx[retrieved on Oct. 13, 2022], entire document.

(Continued)

*Primary Examiner* — Jamal Javaid
(74) *Attorney, Agent, or Firm* — McClure, Qualey & Rodack, LLP

(57) ABSTRACT

Switching operations are described that provide greater reliability for multilink operations between an access point multilink device (AP MLD) and a non-AP MLD in a wireless communications network. The AP MLD announces that the AP MLD switches one of the multilinks necessary for the multilink operation. The non-AP MLD determines whether an AP operating on a switching link has resumed basic service set (BSS) operation on a target channel.

11 Claims, 9 Drawing Sheets

Related U.S. Application Data

(60) Provisional application No. 63/310,158, filed on Feb. 15, 2022.

(56) References Cited

OTHER PUBLICATIONS

"35. Extremely high throughput (EHT) MAC specification 35.1 Introduction", vol. 802.11be drafts, No. D1.4, (Jan. 27, 2022), pp. 1-116, IEEE Draft; TGBE_CL_35, IEEE-SA, Piscataway, NJ USA, URL: https://grouper.ieee.org/groups/802/11/private/Draft_Standards/11be/Draft%20P802.11be_D1.4%20-%20Figure%20Sources.zip Draft P802.11be_D1.4—Word.zip TGbe_Cl_35.doc, (Jan. 27, 2022), XP068187973 [X] 1,2,5,7-11,13-15 * section 35.3.11—pp. 369-373 * [I] 3,4,6,12.

Extended European Search Report, dated May 23, 2023, for European Patent Application No. 23156846.0, 14 pages.

Chinese Application No. 202310180420.1, Office Action mailed Jan. 13, 2026; 10 pages.

* cited by examiner

MULTILINK DEVICE FOR SWITCHING OPERATION

CROSS-REFERENCE TO RELATED APPLICATIONS AND INCORPORATION BY REFERENCE

This application is a continuation-in-part of U.S. Non-provisional patent application Ser. No. 18/103,999, titled "Multilink Device for Switching Operation," which was filed on Jan. 31, 2023, which claims the benefit of U.S. Provisional Patent Appl. No. 63/310,158, filed Feb. 15, 2022, all of which are incorporated herein by reference in their entirety.

BACKGROUND

In recent years, demands for high-speed and reliable wireless communication technology have been increasing. For example, in wireless technologies such as wireless local area networks, the need for ever-increasing data speeds and reliability continues unabated.

Wireless local area networks contemplate the use of multiple links between access points and client devices in a bid to support these needs. For example, the access points and client devices use two or more radios to maintain corresponding links between each other. These multiple links may be in different channels or different frequency bands. Given the close physical proximity of the multiple radios, challenges exist to ensure that increased data throughput and reliability are realized. These multiple links typically use the IEEE 802.11 standard, which has recently contemplated the challenges and opportunities of the multiple links.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings.

Figure 1:
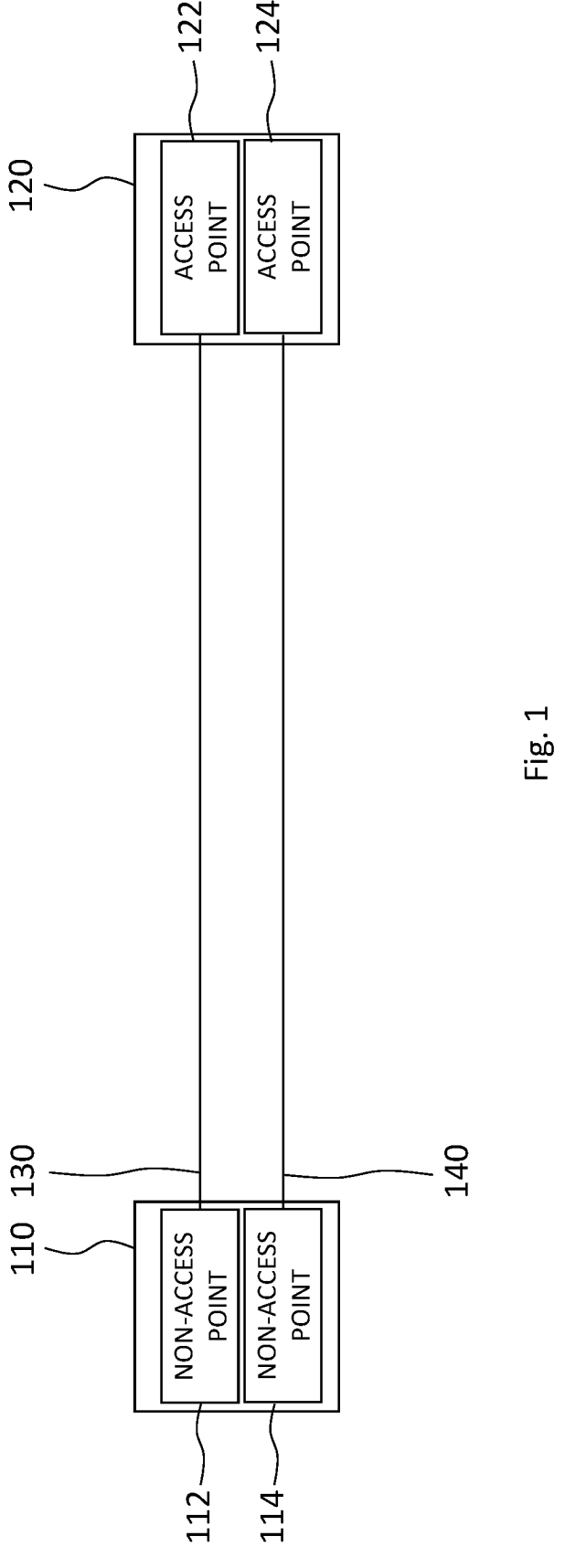
FIG. 1 illustrates an overview of a wireless communication system using multilinks, according to some embodiments of the present disclosure.

The present disclosure will now be described with reference to the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition does not in itself dictate a relationship between the various embodiments and/or configurations discussed.

As noted above, wireless local area networks contemplate the use of multiple links between access points and client devices to provide increased data throughput and reliability. The IEEE 802.11 standard, which provides specifications governing the operation and performance of wireless local areas networks, has begun to consider the use of multiple links. Such multiple links typically use different channels and/or different frequency bands. However, the close physical proximity of the multiple radios needs to be considered to ensure that any interference between the multiple radios is properly addressed.

FIG. 1 illustrates exemplary multilink operation in a wireless communication network in which multiple access points and multiple non-access points work together. In the multilink operation, multiple links are formed between a device 110 with multiple non-access points 112, 114, such as client devices and a device 120 with multiple access points 122, 124. Both devices 110, 120 can communicate using multiple links 130, 140 to achieve fast and/or reliable communication. Devices 110, 120 are called multilink devices (MLD).

1. Overview of a Multilink Operation

This disclosure is applicable to apparatuses, systems, and methods that perform multilink operations. In the following, FIG. 2 is used to illustrate an example of a multilink operation.

Figure 2:
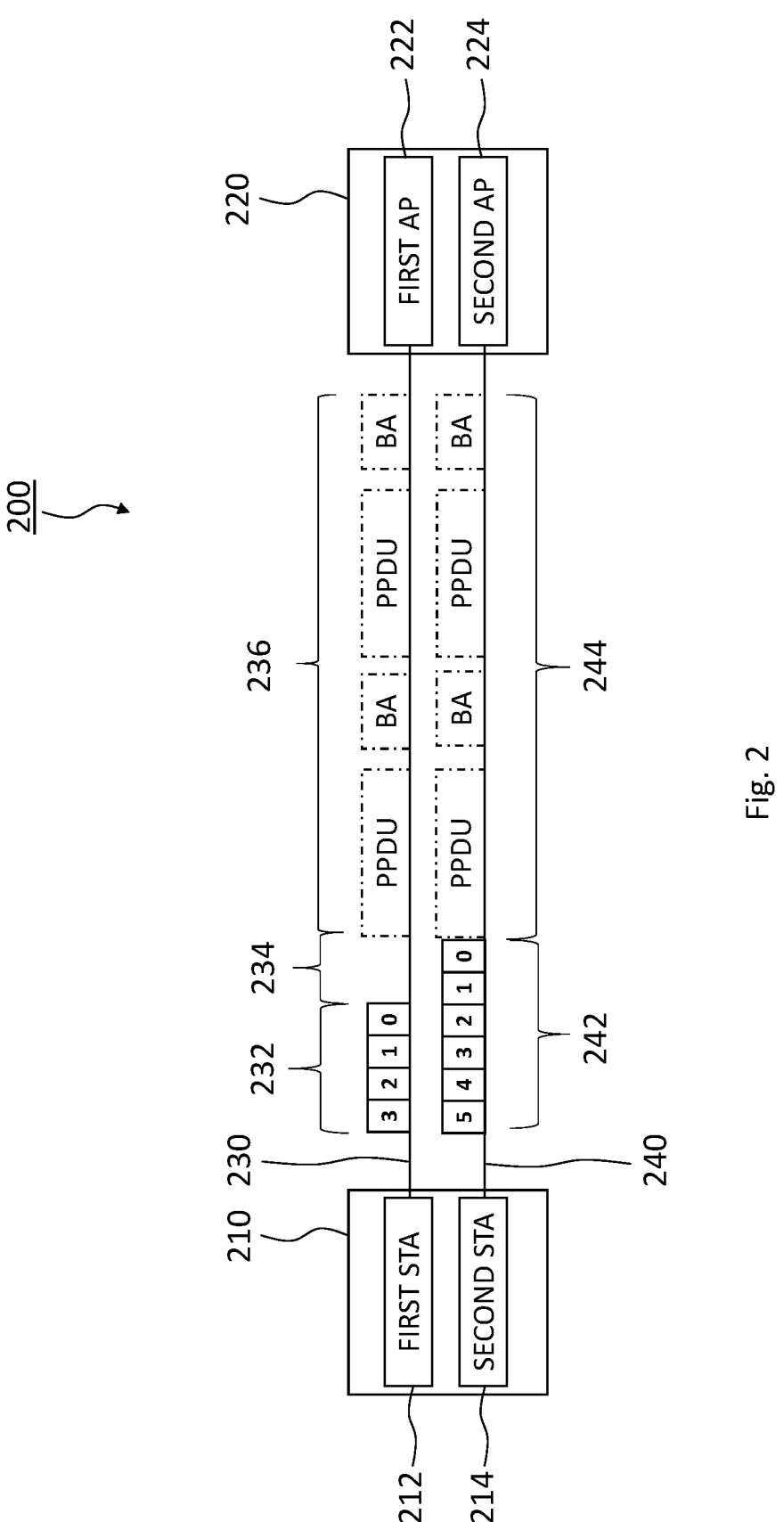
FIG. 2 illustrates a block diagram of a wireless communication system, according to some embodiments of the present disclosure.

In particular, FIG. 2 illustrates a block diagram of a wireless communication system according to some embodiments of the present disclosure.

A system 200 is a system for multilink operation. The system 200 comprises a non-access point multilink device (non-AP MLD) 210, an access point multilink device (AP MLD) 220, a primary link 230, and a non-primary link 240 formed wirelessly between the non-AP MLD 210 and the AP MLD 220.

The non-AP MLD 210 has a first station (STA) 212 and a second STA 214. Each STA has the necessary components for communication with the access point (AP), such as an antenna, radio frequency (RF) transceiver modules and a baseband processor. The details of the non-AP MLD are explained below with reference to FIG. 3.

Figure 3:
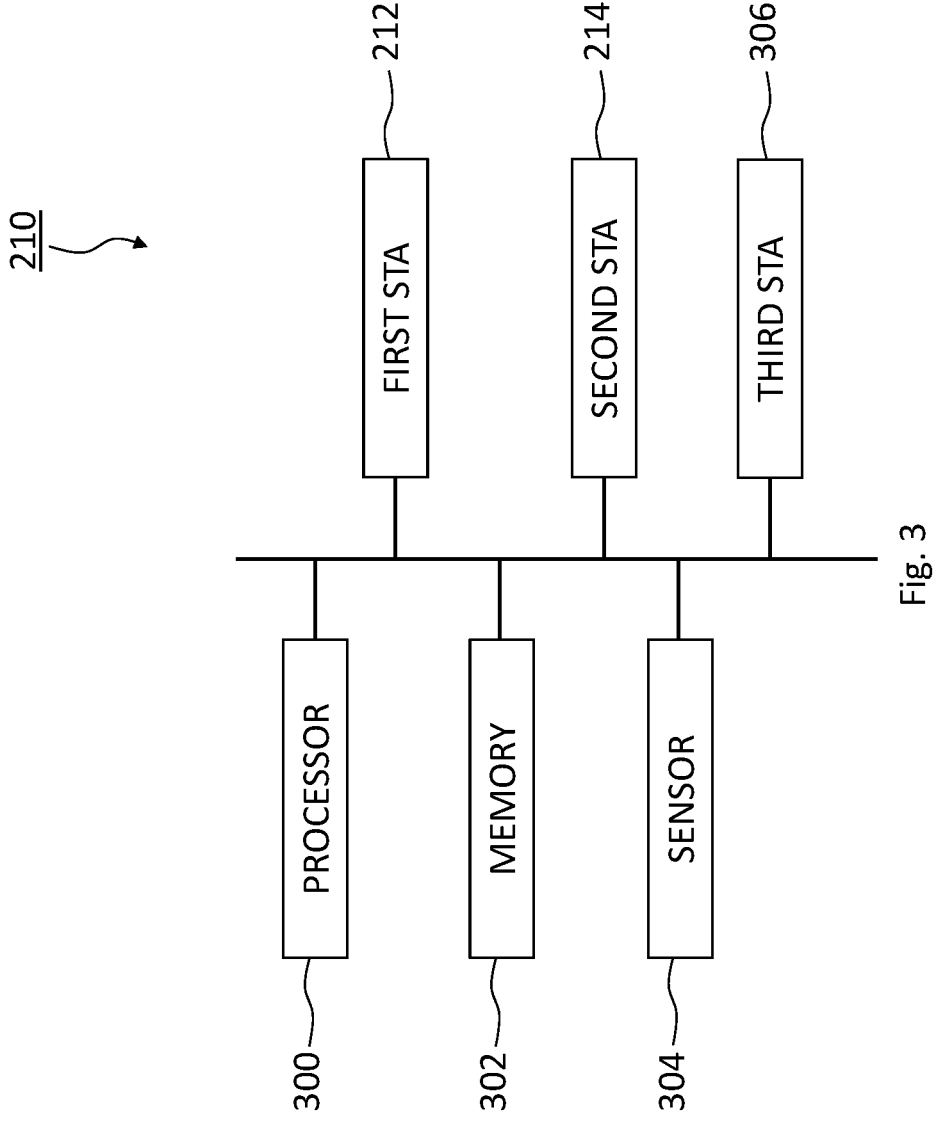
FIG. 3 illustrates a block diagram of a non-access point (non-AP) multilink device (MLD), according to some embodiments of the present disclosure.

FIG. 3 illustrates a block diagram of the non-AP MLD, according to some embodiments of the present disclosure. The non-AP MLD 210 has, in addition to the first STA 212 and second STA 214, a processor 300, memory 302, and sensor 304. The processor 300 controls the components that make up the non-AP MLD 210. Memory 302 temporarily or permanently stores information necessary for operation of the non-AP MLD 210. Sensor 304 detects signal strength to monitor the quality of wireless communications performed by the non-AP MLD 210. Although omitted in FIG. 2 for simplicity of explanation, the non-AP MLD 210 may have a third STA 306. In various embodiments of this disclosure, an MLD may have two or more STAs or APs.

Returning to FIG. 2, the AP MLD 220 has a first access point (AP) 222 and a second AP 224. Each AP has the necessary components for communication with the STA, such as the antenna, RF transceiver modules and the baseband processor. The details of the non-AP MLD are explained below with reference to FIG. 4. In this disclosure, each link may comprise the antenna and the RF transceiver modules of non-AP MLD 210 and AP MLD 220.

Figure 4:
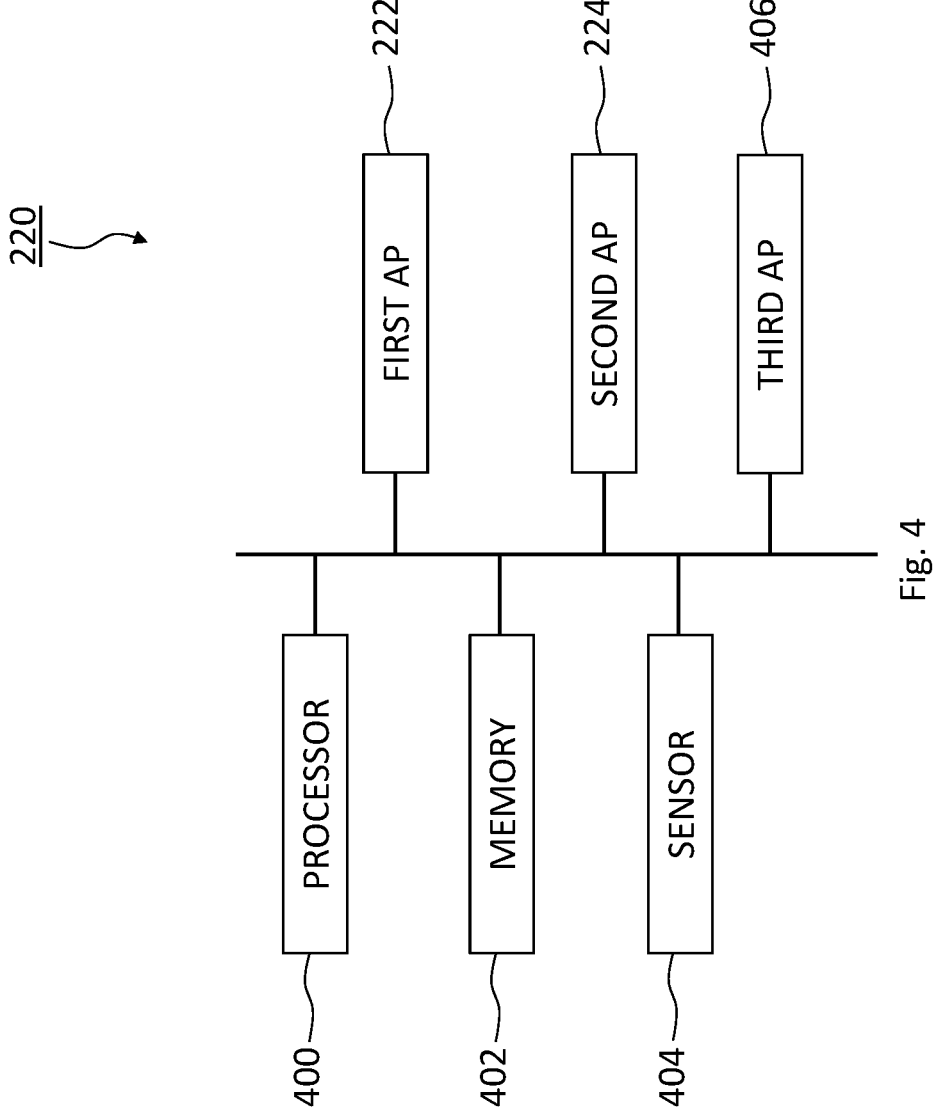
FIG. 4 illustrates a block diagram of an access point (AP) MLD according to some embodiments of the present disclosure.

FIG. 4 illustrates a block diagram of the AP MLD, according to some embodiments of the present disclosure. The description of each component of the AP-MLD 220 is substantially similar to that of the non-AP MLD 210 described in FIG. 3 and is therefore omitted.

Returning to FIG. 2, the primary link 230 is a wireless link formed between the first STA 212 and the first AP 222. The non-primary link 240 is a wireless link formed between the second STA 214 and the second AP 224. Each link uses its assigned operating class/channel as its communication channel. In this disclosure, a plurality of links established between non-AP MLD 210 and AP MLD 220 for multilink operation may be called multilinks. In this disclosure, the primary link 230 may also be referred to as a first link, the non-primary link 240 as a second link, and an additional link described below as a third link.

As shown in FIG. 2, a communication operation using multilinks is called the multilink operation. The multilink operation may comprise two operation modes.

Simultaneous transmit and receive operation (STR) mode is one operation mode. In the STR mode, the multilinks operate independently. Thus, each link can transmit and receive data simultaneously.

Non-STR (NSTR) mode is another operation mode. In the NSTR mode, the multilinks do not operate independently of one another. For example, operation in the STR mode cannot be assured if data cannot be successfully transmitted and received. In such a scenario, STR mode is not feasible and NSTR mode becomes necessary.

One criterion for choosing which of these modes to use is the potential for, or actual existence, of in-device coexistence (IDC) interference. For example, when the multilinks of the multiple-link operation are close to each other, the MLD device has the IDC interference. The MLD operating on multilinks with the IDC interference may not support the STR operation mode. Thus, in such a situation, the NSTR operation mode is preferred.

As one of ordinary skill in the art would recognize, it is desirable to use the STR operating mode whenever feasible since simultaneous link usage maximizes data throughput. However, interference may preclude the use of STR operating mode.

When the MLD operates using the NSTR mode, the non-AP MLD and the AP MLD can avoid IDC interference by performing contention-based channel access on the respective links and starting transmission at the same time with the following constraints, as described below.

An example of the non-AP MLD 210 transferring data to the AP MLD 220 in the NSTR mode is illustrated in FIG. 1. In the NSTR mode, at least one link is designated as the primary link, and other links are defined as non-primary links. As already explained, in the example in FIG. 2, one link is the primary link 230, and another link is the non-primary link 240. To transfer data from the non-AP MLD 210 to the AP MLD 220, the first STA 212 and the second STA 214 should initiate a PPDU (PLCP (Physical Layer Convergence Protocol) Protocol Data Unit) transmission for the primary link (or first link) 230 and the non-primary link (second link) 240. However, in the NSTR mode, the second STA may initiate the PPDU transmission of the second link 240 only if the first STA 212 (affiliated with the same MLD in the primary link) is initiating the PPDU transmission as a transmit opportunity (TXOP) holder with the same start time. This is because there is a risk of IDC if one STA transmit the signal and another STA belonging to the same MLD receives the signal at the same time independently. Thus, in the NSTR mode, one of the STAs becomes the reference and other STAs transmit the signal at the same time.

As shown in FIG. 2, the first STA 230 and the second STA 240 start the enhanced distributed channel access (EDCA) back off 232 and 242 on each link as TXOP initiators. In the example shown in FIG. 2, the first link 230 is allocated four slots of random backoff (RBO) counts, and the second link 240 is allocated six slots of RBO counts. When the first link 230's RBO counts down to zero, the first STA 212 becomes idle for waiting for the second link 240's RBO to count down. After that, when the second link 240's RBO counts down to zero, and if the first STA 212 is still idle, the first STA 212 and the second STA may transmit upstream data 236 and 244. The second STA 214 may use its sensor to detect whether the first STA 212 is still idle. The upstream data 236 and 244 may contain PPDUs and Block Acks (BA). The start of PPDU on a waiting link (the primary link 230 in FIG. 2's case) shall be aligned with the start of PPDU on the other link (the secondary link 240 in FIG. 2's case). The end of PPDUs on the first link 230 and the second link 240 is required to be aligned.

However, if one link needs to switch its operating class/channel due to interference, a regulatory requirement, or for other reasons, the non-AP MLD 210 affiliated with AP MLD 220 might not be able to switch to a new channel indicated by the AP MLD 220, or the non-AP MLD 210 might not know when the AP MLD 220 has resumed basic service set (BSS) operation on the new channel and therefore the transmission on the new channel initiated by either the non-AP MLD 210 or the AP MLD 220 on the new channel might fail and the spectrum efficiency will be decreased. To address this issue, a channel-switching scheme is presented as an example in this disclosure. According to one example of this disclosure, the non-AP MLD 210 can notify whether switching is possible according to its own situation and request to continue communication. According to one example of this disclosure, the AP MLD 220 can announce the switching of the non-primary link 240 over the primary link 230, even if they are operating in the NSTR mode. According to one example of this disclosure, the AP MLD 220 can indicate the BSS operation has resumed on the new channel of the non-primary link 240 in a Beacon frame and Probe Response frame over the primary link 230 by stopping sending the Max Channel Switch Time element in per-STA profile sub-element corresponding to the non-primary link in the frame after the channel switching of the non-primary link 240 has completed. According to one example of this disclosure, the non-AP MLD 210 and the AP MLD 220 can keep communicating even if the AP MLD 220 decides not to switch the link. It is emphasized again here that this disclosure is not only applicable to systems operating in the NSTR mode. In systems that operate other than the NSTR mode, if an AP MLD schedules a channel switch for a link to a new operating class/channel, it is preferred that the behavior of an associated non-AP MLD is defined.

2. Channel-Switching Scheme for the Non-AP MLD 2.1 Switching the Non-Primary Link This section shows operation of the non-AP MLD 210 when the AP MLD 220 switches the non-primary link 240.

Figure 5:
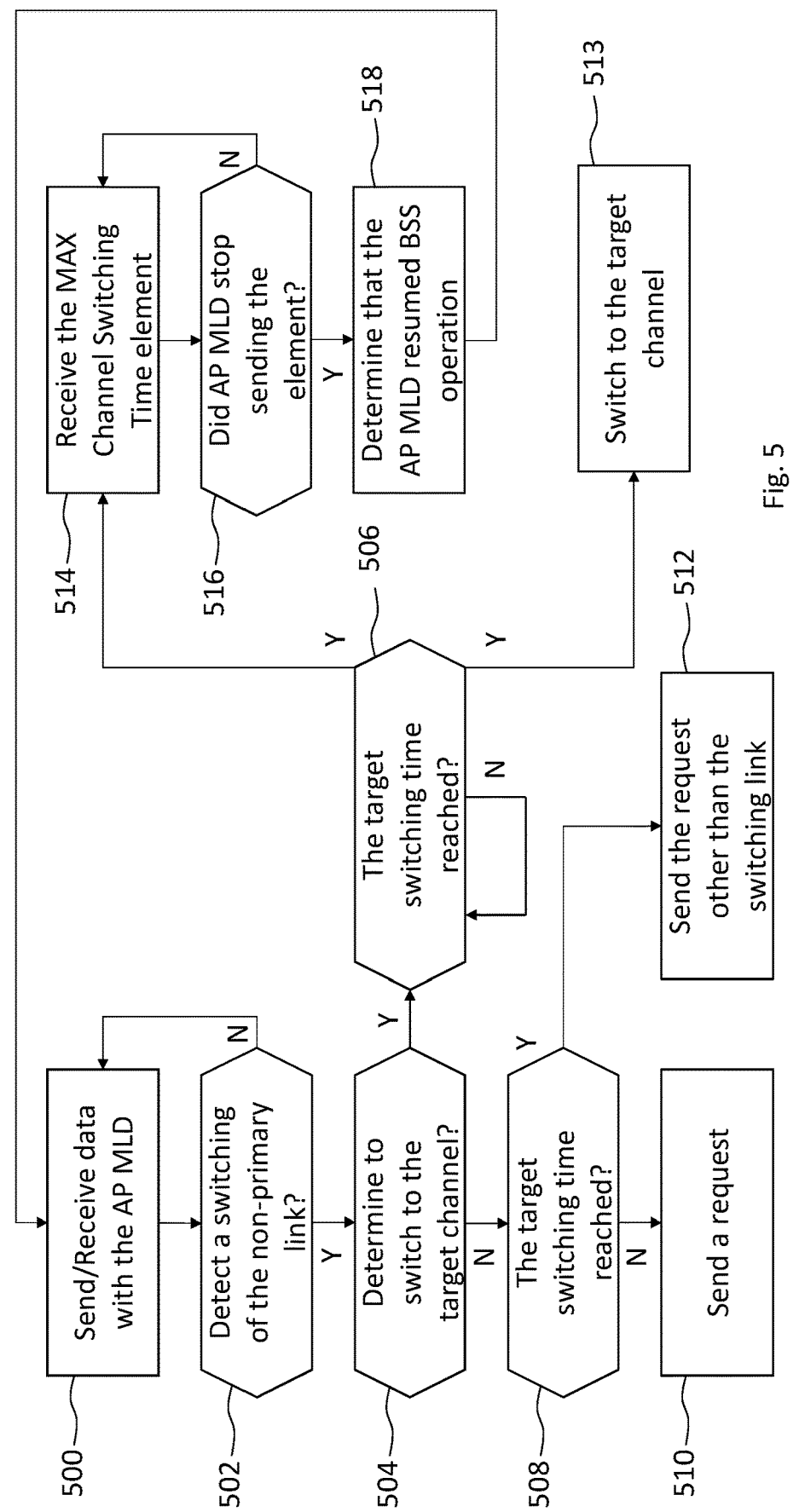
FIG. 5 illustrates a flowchart of an operation of a non-AP MLD, according to an embodiment of the present disclosure.

FIG. 5 illustrates a flowchart of an operation of the non-AP MLD according to an embodiment of the present disclosure. Unless otherwise noted, the processing of each operation is performed by processor 300 of the non-AP MLD 210 in cooperation with its other components.

At operation 500, the non-AP MLD 210 sends/receives data to/from the AP MLD 220.

At operation 502, the non-AP MLD 210 determines whether the non-AP MLD 210 detects switching of the non-primary link 240. The non-AP MLD 210 can detect the switching of the non-primary link 240 in a variety of ways. One example of detecting the switching of the non-primary link 240 is the method described later in this disclosure. The method of the switching of the non-primary link 240 is not limited to the method described in this disclosure; for example, the AP MLD may directly or indirectly notify the non-AP MLD of the switching, or the system administrator may automatically or manually notify the non-AP MLD.

If the non-AP MLD 210 does not detect the switching of the non-primary link 340, the process returns to operation 500.

When the non-AP MLD 210 detects the switching, the process moves to operation 504. The non-AP MLD 210 may also detect a target channel at the same time. The target channel is the channel to which an operational channel of the non-primary link 240 is switched. The target channel is identified by information indicating, for example, the operating class/channel. The non-AP MLD 210 may also detect a target switching time at the same time. The target switching time is information that provides an estimate of when the AP MLD 220 will switch the non-primary link 240.

At operation 504, the non-AP MLD 210 determines whether the non-AP MLD 210 switches to the target channel. There are many reasons not to switch to the target channel. For example, one reason not to switch to the target channel includes interference, a regulatory requirement, or for other comparable reasons.

If the non-AP MLD 210 determines to switch to the target channel, the process moves to operation 506. At operation 506, the non-AP MLD 210 determines whether the target switching time has been reached.

At operation 508 (the non-AP MLD 210 determined "no" in operation 504), the non-AP MLD 210 determines whether the target switching time has been reached.

If the non-AP MLD 210 determines that the target switching time has not passed, the process moves to operation 510. At operation 510, the non-AP MLD 210 sends a request to the AP MLD 220.

The request is a message that indicates that the non-AP MLD 210 removes a switching link from links which are already established between the AP MLD 220. Here, the switching link means the link to be switched (the nonprimary link 240 in this section). The request can take various forms. Some examples of these are described below.

One example of the request is a TID (Traffic Identifier)-To-Link mapping request. TID is an identifier that identifies the data frame to be transmitted over the link. TID-To-Link mapping request indicates the mapping between the TID and the link over which the data frame with that TID is transmitted. At operation 510, the non-AP MLD 210 may send the TID-To-Link mapping request, which maps TIDs to the link other than the target channel and the switching link, to avoid communication on the link where the non-AP MLD 210 has decided not to switch to the target channel of the switching link. The TID-To-Link mapping request may preferably include a target timer indicating the time at which the non-AP MLD 210 will start the requested mapping. Using the TID-To-Link mapping request as an example of a request may be superior for the following reason. The switching can be accomplished quickly and easily because the connection between the non-AP MLD 210 and the AP MLD 220 does not have to be reassociated.

Another example of the request is a reassociation request. The reassociation request is a request to set up a new link or new multilinks. During the reassociation, AP MLD 220 or non-AP MLD 210 may avoid including the switching link operating on the target channel into the new link or the new multilinks.

Another example of the request is a link reconfiguration request or a removal request. The link reconfiguration request or the removal request are requests to delete the switching link from the multilink configuration. The requests may include a delete timer to indicate a time to delete the link. Using the link reconfiguration request or the removal request as an example of a request has an advantage. The switching can be accomplished quickly and easily because the connection between the non-AP MLD 210 and the AP MLD 220 does not have to be reassociated.

The link that sends the request can be either a primary link or a non-primary link.

However, in some cases, the AP MLD 220 forces the non-AP MLD 210 to stop transmission until the channel switch takes place by setting a Channel Switch mode in a Channel Switch Announcement element or an Extended Channel Switch Announcement element. In such cases, the request may only be sent on other links that the non-AP MLD 210 is using.

If the target switching time has elapsed, at operation 512, the non-AP MLD 210 sends the request using a link other than the switching link because the switching link is not available at that time.

At operation 513, after the non-AP MLD 210 determines that the target switching time has been passed, the non-AP MLD 210 switches the non-primary link 240 to the target channel. At operation 514, after the non-AP MLD 210 determines that the target switching time has been passed, the non-AP MLD 210 receives a MAX Channel Switch Time element corresponding to the AP 224 of the AP MLD 220 (the AP operating on the switching link). The Max Channel Switch Time element indicates the estimated time between the time the Max Channel Switch Time element is transmitted and the time the second AP 224 of the AP MLD 220 resumes the BSS operation on the new channel of the non-primary link 240. The Beacon frame and the Probe response frame emitted by AP MLD 220 include a multilink element. The multilink element includes a Per STA profile sub-element corresponding to the non-primary link. Since the first AP 222 (the AP operating on other than the switching link) of AP MLD 220 still emits the Beacon frames or Probe Response frame, the AP MLD 220 can notify the non-AP MLD 210 of the estimated time for BSS operation resumption on the target channel of the switching link.

At operation 516, the non-AP MLD 210 determines whether the AP 222 of the AP MLD 220 stops sending the MAX Channel Switching Time element.

If the non-AP MLD 210 determines that the AP 222 stops sending the MAX Channel Switching Time element, the non-AP MLD 210 determines that the AP 224 of the AP MLD 220 resumed BSS operation, at operation 518. This is because the AP MLD 220 may stop sending the element after detecting that the AP 224 resumes the BSS operation. After determining that the AP 224 of AP MLD resumed BSS operation, the non-AP MLD 210 may resume the multilink operation.

2.2 Switching the Primary Link

This section shows operation of the non-AP MLD 210 when the AP MLD 220 switches the primary link 230. In this section, the non-AP MLD 210 and the AP MLD 220 are operating the multilink operation by using the NSTR mode.

Figure 6:
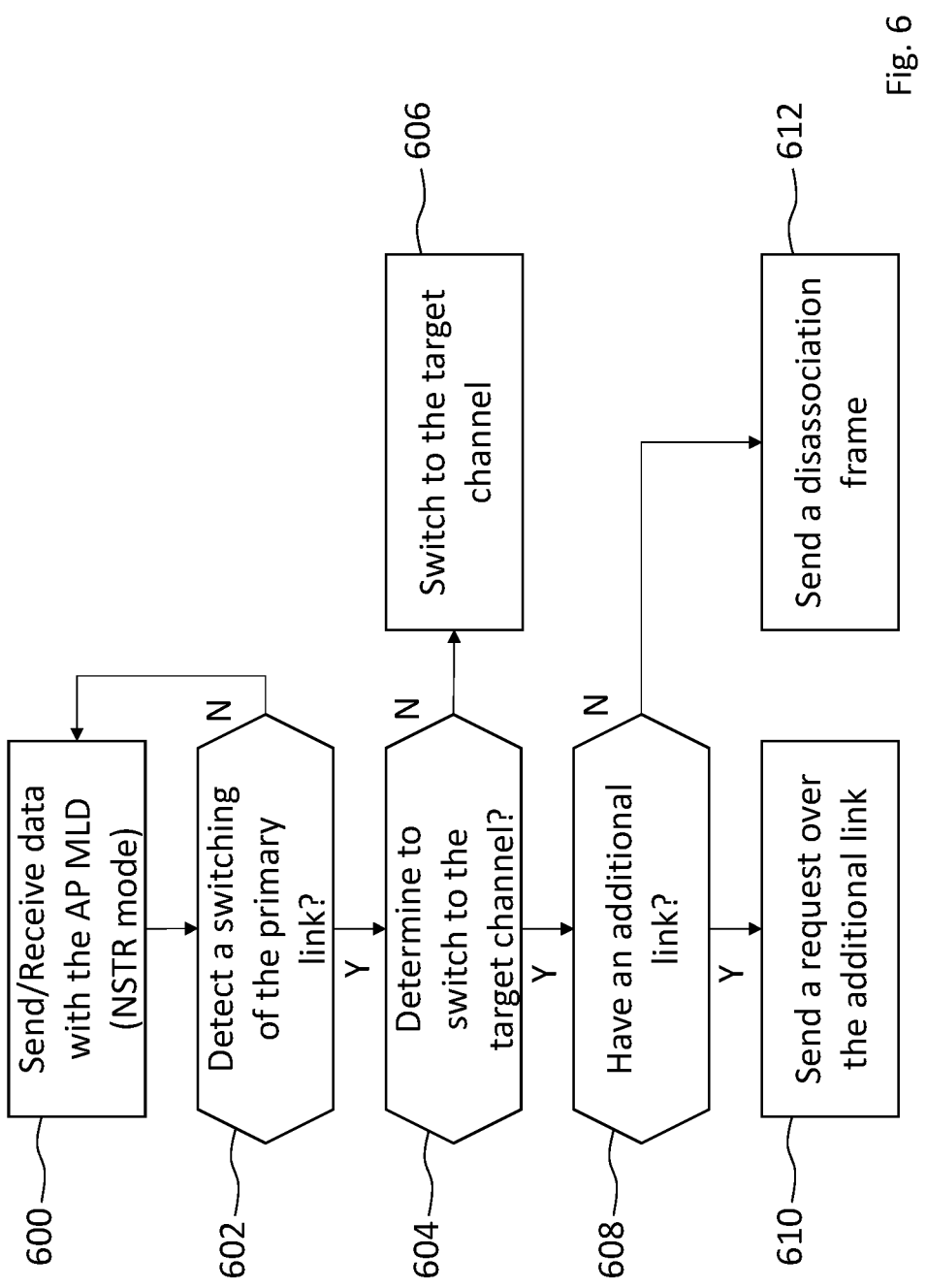
FIG. 6 illustrates a flowchart of an operation of a non-AP MLD, according to an embodiment of the present disclosure.

FIG. 6 illustrates a flowchart of an operation of the non-AP MLD, according to an embodiment of the present disclosure. Unless otherwise noted, the processing of each operation is performed by processor 300 of the non-AP MLD 210, in cooperation with the other components.

At operation 600, the non-AP MLD 210 sends/receives data to/from the AP MLD 220.

At operation 602, the non-AP MLD 210 determines whether the non-AP MLD 210 detects switching of the primary link 230. The non-AP MLD 210 can detect the switching of the non-primary link 230 in a variety of ways.

If the non-AP MLD 210 does not detect the switching of the primary link 230, the process returns to operation 600.

When the non-AP MLD 210 detects the switching, the process moves to operation 604. The non-AP MLD 210 may also detect the target channel at the same time.

At operation 604, the non-AP MLD 210 determines whether the non-AP MLD 210 switches to the target channel.

If the non-AP MLD 210 determines to switch to the target channel, the process moves to operation 606. At operation 606, the non-AP MLD 210 switches the primary link 230 to the target channel.

At operation 608 (the non-AP MLD 210 determined "no" in operation 604), the non-AP MLD 210 determines whether the non-AP MLD 210 and the AP MLD 220 have established an additional link other than the primary link 230 and the non-primary link 240. For example, the non-AP MLD 210 and the AP MLD 220 may establish a third link between the third STA 306 and the third AP 406.

If the non-AP MLD 210 determines that there is the additional link, the process moves to operation 610. At operation 610, the non-AP MLD 210 sends the request to the AP MLD 220 over the additional link.

The examples of the request are similar in principle to the explanation given in section 2.1, but differ from them in several respects, as follows.

If the non-AP MLD 210 sends the TID-To-Link mapping request as the request at operation 610, the non-AP MLD 210 may send the TID-To-Link mapping request which maps TIDs to the link other than the primary link and the non-primary link. This is because, as already explained, the non-primary link 240 cannot initiate communication without the primary link 230.

If the non-AP MLD 210 sends the reassociation request as the request, at operation 610, during the reassociation, AP MLD 220 or non-AP MLD 210 may try not to include the primary link, the non-primary link, and the target channel into the new link or the new multilinks.

If the non-AP MLD 210 sends the link reconfiguration request or the removal request as the request, at operation 610, the delete timer indicates a time(s) to delete both links.

If the non-AP MLD 210 determines that there is no additional link, the process moves to operation 612. At operation 612, the non-AP MLD 210 sends a disassociation frame over the primary link 230. After sending the disassociation frame, the non-AP MLD 210 initiates a multilink teardown procedure.

3. Channel-Switching Scheme for the AP MLD

This section shows operation of the AP MLD 220 when the AP MLD 220 determines to switch the non-primary link 240. In this section, the non-AP MLD 210 and the AP MLD 220 are operating the multilink operation by using the NSTR mode.

Figure 7:
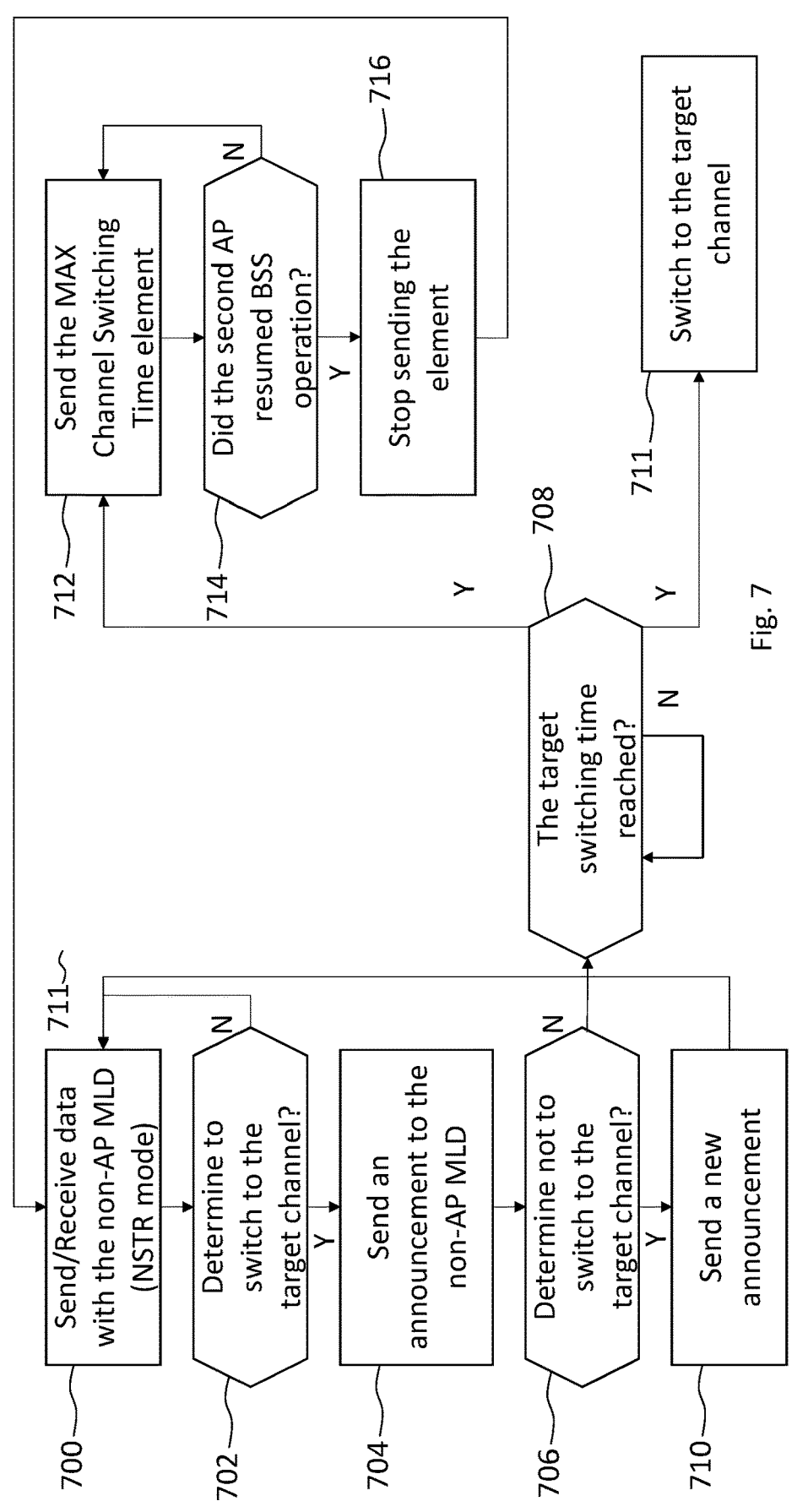
FIG. 7 illustrates a flowchart of an operation of a AP MLD, according to an embodiment of the present disclosure.

FIG. 7 illustrates a flowchart of an operation of the AP MLD, according to an embodiment of the present disclosure. Unless otherwise noted, the processing of each operation is performed by processor 400 of the AP MLD 220 in cooperation with the other components.

At operation 700, the AP MLD 220 sends/receives data to/from the non-AP MLD 210.

At operation 702, the AP MLD 220 determines whether the AP MLD 220 switches the non-primary link 240 to the target channel. If the AP MLD 220 does not switches the non-primary link 240 to the target channel, the process returns to operation 700.

At operation 704, the AP MLD 220 sends an announcement to the non-AP MLD 210. The announcement indicates that the AP MLD 220 switches the non-primary link to the target channel. The announcement indicates an operating class/channel of the target channel. The announcement may further indicate the target switching time.

The announcement can take various forms. Some examples of these are described below.

One example of the announcement is the Channel Switch Announcement element or the Extended Channel Switch Announcement element transmitted on the primary link 230. The AP MLD 220 emits a Beacon frame on the primary link 230 periodically. The AP MLD 220 also transmits a Probe response frame on the primary link 230 as a response to the Probe request from the non-AP MLD 210. The Beacon frame and the Probe response frame includes a multilink element. The multilink element includes a Per STA profile sub-element. The Per STA profile sub-element corresponding to the non-primary link of the multilink element carries a profile of the non-primary link 240. At operation 704, the AP MLD 220 may indicate the switching of the non-primary link 240 by including the Channel Switch Announcement element or the Extended Channel Switch Announcement element into the Per STA profile sub-element corresponding to the non-primary link. In this way, the announcement can be sent in the Beacon frames or the Probe response frames.

The Channel Switch Announcement element or the Extended Channel Switch Announcement element can be carried in a Channel Switch Announcement Frame or an Extended Channel Switch Announcement frame transmitted on the primary link 230. These frames are not sent in the Beacon or the Probe response frames.

The Channel Switch Announcement element, the Extended Channel Switch Announcement element, the Channel Switch Announcement Frame, and the Extended Channel Switch Announcement frame may be sent on the link to indicate the channel switching of that link. However, in this disclosure, the scheme uses elements/frames to indicate the channel switching of other links.

The frame that carries the Channel Switch Announcement element or the Extended Channel Switch Announcement element may indicate a link ID information of the non-primary link 240 to indicate which link to be switched. The AP MLD 220 can indicate the link ID in various ways.

The link ID information may be a MAC address of the second AP 224 described as an A3 address in a MAC header of the corresponding frame. By indicating a MAC Address of an AP affiliated with the AP MLD 220 operating on the non-primary link 240, the AP MLD 220 can indicate the link ID information. Thus, the AP MLD 220 may indicate the second AP 224's MAC address as the A3 address.

The AP MLD 220 can also indicate the link ID information by using a link ID subfield of the corresponding frame. The link ID information corresponds to the link ID of the non-primary link 240.

Another example of the announcement s data described in a Neighbor AP Information field corresponding to the non-primary link 240 in the Reduced Neighbor Report (RNR) element in Beacon frames on the primary link 230. As explained above, the AP MLD 220 emits the Beacon frames on the primary link 230 periodically. The Beacon frame includes various kinds of elements. The RNR element is one of the elements and is used to notify the neighbor AP's status. The RNR may include the second AP 224's status corresponding to the non-primary link 240. The Neighbor AP Information field of the RNR has an Operating Class field and Channel Number field. At operation 704, the AP MLD 220 includes the operating class/channel of the target channel at the target switching time into the Operating Class field or the Channel Number field of the Neighbor AP Information field corresponding to the non-primary link 240 in the RNR element.

At operation 706, if the announcement is the data described in the Operating Class field or the Channel number field, the AP MLD 220 determines whether the AP MLD 220 fails to or decides not to switch to the target channel. If the AP MLD 220 does not fail to or decide not to switch to the target channel, the process moves to operation 708. At operation 708, the AP MLD 220 determines that the target switching time has been reached.

At operation 711, after the AP MLD 220 determines that the target switching time has been reached the AP 224 of the AP MLD 220 switches the non-primary link 240 to the target channel. At operation 712, after the AP MLD 220 determines that the target switching time has been reached, the AP 222 of the AP MLD 220 may send the Max Channel Switch Time element corresponding to the AP 224 indicating the estimated time between the time the Max Channel Switch Time element is transmitted and the time the AP 224 resumes the BSS operation on the new channel of the non-primary link 240 by using the Beacon frame or the Probe response frame. As mentioned before, the Beacon frame or the Probe response frame emitted by the AP 222 of AP MLD 220 includes a multilink element. The multilink element includes a Per STA profile sub-element corresponding to the non-primary link 240. Since the first AP 222 (the AP operating on other than the switching link) of AP MLD 220 still emits the Beacon frames or Probe Response frame, the AP MLD 220 can notify the non-AP MLD 210 of the estimated time for BSS operation resumption on the target channel of the switching link.

At operation 714, the AP MLD 220 determines whether the second AP 224 resumes the BSS operation on the non-primary link (switched link).

After determining that the second AP 224 resumes the BSS operation on the non-primary link (switched link), the AP MLD 220 stops sending the Max Channel Switch Time element. In this way, the AP MLD 220 can notify the non-AP MLD 210 that the second AP 224 resumes the BSS operation on the non-primary link (switched link). Corresponding to operations 712 to 716 described above, the non-MLD 210 also performs operations 810 to 814 as described later.

It is noted that operations 712 through 716 are also applicable to multilink operations operating in modes other than NSTR mode. If the AP MLD 220 switched one of the links, the AP operating on other than the switching link of AP MLD 220 sends the MAX Channel Switching Time element corresponding to the AP operating on the switching link by using the Beacon frame or the Probe response frame.

If the AP MLD 220 fails to or decides not to switch to the target channel and the AP MLD 220 includes the operating class/channel of the target channel into the Operating Class field or the Channel Number field, the process moves to operation 710. At operation 710, the AP MLD 220 sends a new announcement. AP MLD 220 may keep the current operating class/channel of the non-primary link 240 in the Operating Class field or the Channel Number field at or after the target switching time. In other words, AP MLD 220 sets the Operating class and Channel Number fields in the RNR element corresponding to the non-primary link 240 to the initial operating class and the operating channel of the non-primary link 240 (the second link).

When operation 710 is performed by the AP MLD 220, the non-AP MLD 210 can detect that the AP MLD 220 is not switching. Operation of the non-AP MLD 210 at this time is explained with reference to FIG. 8.

Figure 8:
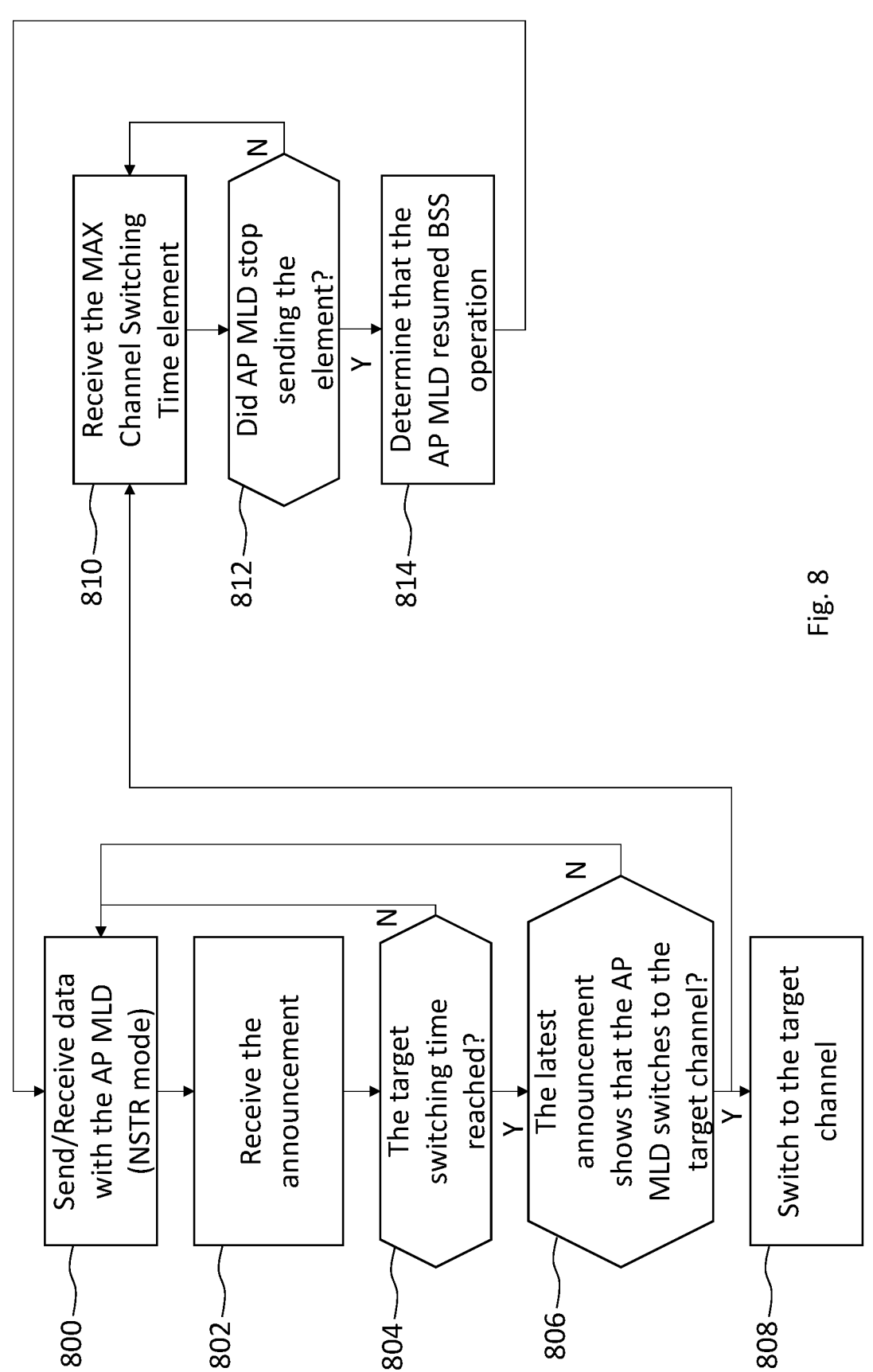
FIG. 8 illustrates a flowchart of an operation of a non-AP MLD, according to an embodiment of the present disclosure.

FIG. 8 illustrates a flowchart of an operation of the AP MLD, according to an embodiment of the present disclosure. Unless otherwise noted, the processing of each operation is performed by processor 300 of the non-AP MLD 210 in cooperation with its other components.

At operation 800, the non-AP MLD 210 sends/receives data to/from the non-AP MLD 210. Operation 800 is a kind of steady-state operation.

At operation 802, the non-AP MLD 210 receives the announcement sent at operation 704. In this case, at operation 704 AP MLD 220 sends the announcement by including the operating class/channel of the target channel at the target switching time into the Operating Class field or the Channel Number field of the Neighbor AP Information field corresponding to the non-primary link 240 in the RNR element.

At operation 804, the non-AP MLD 210 determines whether the target switching time has been reached. If the target switching time has not been reached, the process returns to operation 800.

If the target switching time has elapsed, the process moves to operation 806. At operation 806, the non-AP MLD 210 determines whether the last announcement data shows that the AP MLD 220 switches the link. The non-AP MLD 210 determines that the last announcement shows that the AP MLD 220 switches the link when the non-AP MLD 210 identifies that the target operating class/channel of the non-primary link is shown in the Operating Class field and the Channel Number field of Neighbor AP Information field corresponding to the non-primary link 240 in the RNR element.

If the non-AP MLD 210 does not determine that the last announcement shows that the AP MLD 220 switches the link, the process returns to operation 800.

If the non-AP MLD 210 determines that the last announcement shows that the AP MLD 220 switches the link, the process moves to operation 808 and operation 810. At operation 808, the non-AP MLD 210 switches the non-primary link 240 to the target channel.

The non-AP MLD 210 performs operation 810, operation 812, and operation 814. These operations are substantially identical to operations 514 through 518, so the explanation is omitted.

As described in the above sections, the reliability of the multilink operation is improved, even if one link needs to switch operating class/channel due to any reason. The non-AP MLD 210 can notify whether switching is possible according to its own situation and request to continue communication. The AP MLD 220 can announce the switching of the non-primary link 240 over the primary link 230, even if they are operating in the NSTR mode. The non-AP MLD 210 and the AP MLD 220 can keep communicating even if the AP MLD 220 decides not to switch the link.

Figure 9:
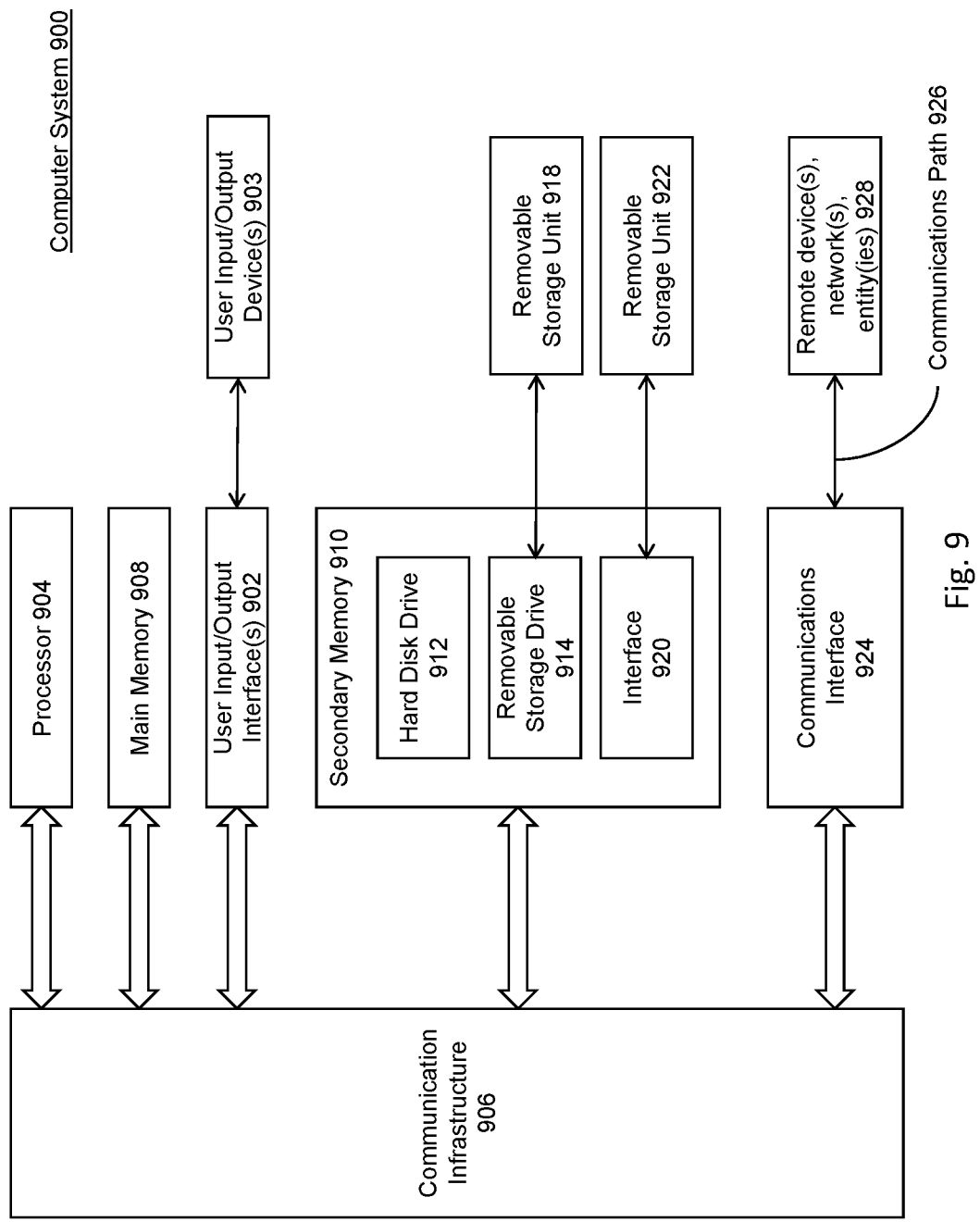
FIG. 9 is an example processor system for implementing some aspects or portion(s) thereof.

Various aspects of the above disclosure can be implemented, for example, using one or more processor systems, such as processor system 900 shown in FIG. 9. Processor system 900 can be any well-known computer capable of performing the functions described herein such as devices 210 and 220 of FIG. 2. Processor system 900 includes one or more processors (also called central processing units, or CPUs), such as a processor 904. Processor 904 is connected to a communication infrastructure 906 (e.g., a bus.) Processor system 900 also includes user input/output device(s) 903, such as monitors, keyboards, pointing devices, etc., that communicate with communication infrastructure 906 through user input/output interface(s) 902. Processor system 900 also includes a main or primary memory 908, such as random access memory (RAM). Main memory 908 may include one or more levels of cache. Main memory 908 has stored therein control logic (e.g., computer software) and/or data.

Processor system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some aspects, secondary memory 910 may include other means, instrumentalities or other approaches for allowing computer programs and/or other instructions and/or data to be accessed by processor system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Processor system 900 may further include communication or network interface 924. Communication interface 924 enables processor system 900 to communicate and interact with any combination of remote devices, remote networks, remote entities, etc. (individually and collectively referenced by reference number 928). For example, communication interface 924 may allow processor system 900 to communicate with remote devices 928 over communications path 926, which may be wired and/or wireless, and may include any combination of LANs, WANs, the Internet, etc. Control logic and/or data may be transmitted to and from processor system 900 via communication path 926.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, processor system 900, main memory 908, secondary memory 910 and removable storage units 918 and 922, as well as tangible articles of manufacture embodying any combination of the foregoing. Such control logic, when executed by one or more data processing devices (such as processor system 900), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 9. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A non-access point multilink device (non-AP MLD) configured to transmit or receive data with an access point multilink device (AP MLD) over a plurality of links including at least a first link and a second link, the non-AP MLD comprising:

processing circuitry;

a transceiver coupled to the processing circuitry; and memory coupled to the processing circuitry, the memory storing instructions that when executed by the processing circuitry perform operations comprising:

detecting on a first link of the plurality of links that a switching link of the plurality of links is to be switched to a target channel by the AP MLD;

determining whether an AP affiliated with the AP MLD operating on the switching link has resumed basic service set (BSS) operation on the target channel; and determining that the AP operating on the switching link has resumed BSS operation on the target channel after detecting that an AP affiliated with the same AP MLD operating on a link other than the switching link stops sending a MAX channel switch Time element corresponding to the AP operating on the switching link.

2. The non-AP MLD of claim 1, wherein the operations further comprise:

determining whether the non-AP MLD switches the switching link to the target channel, and sending a request indicating that the non-AP MLD removes the switching link from the plurality of links after determining that the non-AP MLD does not switch the switching link to the target channel.

3. The non-AP MLD of claim 2, wherein the operations further comprise:

detecting a target switching time, the target switching time being a time at which the switching link is scheduled to be switched to the target channel;

sending the request on at least one of the plurality of links before the target switching time; and sending the request on at least one of the plurality of links other than the switching link after the target switching time.

4. The non-AP MLD of claim 2, wherein the request is at least one of:

a traffic identifier (TID)-to-link mapping request;

a reassociation request; or a link reconfiguration request that requests deletion of the switching link from the plurality of links.

5. The non-AP MLD of claim 1, wherein:

the non-AP MLD is configured to transmit or receive the data with the AP MLD operating on a non-simultaneous transmit and receive operation (NSTR) mode;

the first link is the switching link and a primary link; and the second link is a non-primary link.

6. The non-AP MLD of claim 2, wherein:

the non-AP MLD is configured to transmit or receive the data with the AP MLD operating on an NSTR mode;

the first link is the switching link and a primary link;

the second link is a non-primary link;

the request is a disassociation frame that initiates a tear down procedure; and the operations further comprise:

detecting whether the plurality of links only includes the primary link and the non-primary link, and sending the request after detecting that the plurality of links only includes the primary link and the non-primary link.

7. The non-AP MLD of claim 2, wherein:

the non-AP MLD is configured to transmit or receive the data with the AP MLD operating on an NSTR mode;

the first link is the switching link and a primary link;

the second link is a non-primary link;

the request is at least one of:

a TID-to-link mapping request;

a reassociation request; and a link reconfiguration request that requests deletion of the primary link and the non-primary link, and the operations further comprise:

detecting whether the plurality of links includes an additional link other than primary link and the non-primary link, and sending the request after detecting that the plurality of links includes the additional link.

8. The non-AP MLD of claim 2, wherein:

the non-AP MLD is configured to transmit or receive the data with the AP MLD operating on an NSTR mode;

the first link is a primary link;

the second link is the switching link and a non-primary link; and the operations further comprise:

detecting a target switching time, the target switching time being a time at which the switching link is scheduled to switch to the target channel, which is indicated by a target operating class and channel number; and maintaining the non-primary link after detecting that the target operating class and channel number indicated in a Reduced Neighbor Report element corresponding to the non-primary link is an initial target operating class and channel number of the non-primary link after the target switching time has been reached.

9. A method for transmitting or receiving data over a plurality of links including at least a first link and a second link, performed by a non-access point multilink device (non-AP MLD) and an access point multilink device (AP MLD), the method comprising:

sending, from the AP MLD to the non-AP MLD, an announcement indicating that a switching link is to be switched to a target channel, wherein the switching link is one of the plurality of links;

determining, by the non-AP MLD, whether an AP affiliated with the AP MLD operating on the switching link has resumed basic service set (BSS) operation on the target channel; and determining that the AP operating on the switching link has resumed BSS operation on the target channel after detecting that an AP affiliated with the same AP MLD operating on a link other than the switching link stops sending a MAX channel switch Time element corresponding to the AP operating on the switching link.

10. The method of claim 9, further comprising:

sending, by the AP MLD, a Max Channel Switch Time element corresponding to the second link, in at least one of a beacon frame and a probe response frame on the first link, to the non-AP MLD until an AP operating on the second link resumes a BSS operation on the target channel; and stop sending, by the AP MLD, the Max Channel Switch Time element after the AP operating on the second link resumes the BSS operation on the target channel.

11. The method of claim 10, further comprising:

determining, by the non-AP MLD, that the AP operating on the switching link has resumed BSS operation on the target channel after detecting that an AP affiliated with the same AP MLD operating on a link other than the switching link stops sending the MAX channel switch Time element corresponding to the AP operating on the switching link.

\* \* \* \* \*